(12) United States Patent
Aoyama

(10) Patent No.: US 10,753,244 B2
(45) Date of Patent: Aug. 25, 2020

(54) PLUGGED HONEYCOMB STRUCTURE AND METHOD FOR FORMING PLUGGED HONEYCOMB STRUCTURE

(71) Applicant: NGK INSULATORS, LTD., Nagoya (JP)

(72) Inventor: Tomokatsu Aoyama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 374 days.

(21) Appl. No.: 15/492,366

(22) Filed: Apr. 20, 2017

(65) Prior Publication Data

US 2017/0314436 A1 Nov. 2, 2017

(30) Foreign Application Priority Data

May 2, 2016 (JP) .................................. 2016-092445

(51) Int. Cl.

| F01N 3/022 | (2006.01) |
|---|---|
| B01D 53/00 | (2006.01) |
| B01D 46/00 | (2006.01) |
| B01D 46/24 | (2006.01) |
| B01D 39/00 | (2006.01) |

(Continued)

(52) U.S. Cl.
CPC ......... *F01N 3/0222* (2013.01); *B01D 46/006* (2013.01); *B01D 46/247* (2013.01); *B01D 53/00* (2013.01); *B28B 11/006* (2013.01); *B28B 21/98* (2013.01); *B01D 39/00* (2013.01); *B01D 2046/2481* (2013.01); *B01D 2046/2488* (2013.01); *B01D 2275/406* (2013.01);

(Continued)

(58) Field of Classification Search
None
See application file for complete search history.

(56) References Cited

U.S. PATENT DOCUMENTS 4,364,761 A * 12/1982 Berg .................. B01D 39/2075
156/89.22
4,643,749 A * 2/1987 Miura .................. F01N 3/0222
422/180

(Continued)

FOREIGN PATENT DOCUMENTS

| DE | 10 2017 205 259 A1 | 10/2017 |
|---|---|---|
| JP | 2003-254034 A1 | 9/2003 |
| JP | 2015-067473 A1 | 4/2015 |

OTHER PUBLICATIONS

German Office Action (Application No. 10 2017 003 970.4) dated Oct. 1, 2019 (with English translation).

*Primary Examiner* — Amber R Orlando
(74) *Attorney, Agent, or Firm* — Burr & Brown, PLLC

(57) ABSTRACT

A plugged honeycomb structure includes: a honeycomb substrate and a plugging portion, and is configured to trap particulate matter included in fluid flowing from an inflow side end face to an outflow side end face. The partition wall includes, as raw materials, particulates of a base material and a binder and having a melting point lower than that of the base material, the base material has a particle diameter in a range of 5 μm to 60 μm, a mass ratio of the binder to a total mass of the raw material of the base material and the binder is in a range of 22 mass % to 45 mass %, and the cells include round cells as a part, the round cells being defined by a circular-arc partition wall having a circular-arc shape that is at least a part of the partition wall to have a circular shape or the like.

9 Claims, 5 Drawing Sheets

(51) Int. Cl.
  *B28B 11/00* (2006.01)
  *B28B 21/98* (2006.01)

(52) U.S. Cl.
  CPC ...... *F01N 2330/06* (2013.01); *F01N 2330/34* (2013.01); *F01N 2330/60* (2013.01); *Y02T 10/20* (2013.01)

(56) References Cited

U.S. PATENT DOCUMENTS

| | | | |
|---|---|---|---|
| 7,244,284 B2 | 7/2007 | Miwa et al. | |
| 8,062,603 B2* | 11/2011 | Komori | B01D 46/2429 422/177 |
| 9,259,721 B2 | 2/2016 | Ichikawa et al. | |
| 9,707,516 B2* | 7/2017 | Goto | B01D 53/869 |
| 2004/0258582 A1 | 12/2004 | Miwa et al. | |
| 2005/0016140 A1* | 1/2005 | Komori | B01D 46/247 55/523 |
| 2005/0107244 A1* | 5/2005 | Ichikawa | B01D 53/885 502/60 |
| 2005/0191461 A1* | 9/2005 | Kasai | B01D 39/2068 428/116 |
| 2006/0029769 A1* | 2/2006 | Ichikawa | B01D 39/2062 428/116 |
| 2008/0085394 A1* | 4/2008 | Ohno | B01D 53/9454 428/117 |
| 2008/0261806 A1* | 10/2008 | Konstandopoulos | B01D 53/944 502/303 |
| 2010/0300291 A1* | 12/2010 | Vincent | B01D 46/247 95/273 |
| 2011/0126973 A1* | 6/2011 | Andrewlavage, Jr. | B28B 19/0038 156/247 |
| 2012/0017554 A1* | 1/2012 | Iwasaki | B01D 46/2418 55/488 |
| 2012/0251402 A1* | 10/2012 | Goto | B01D 46/2474 422/180 |
| 2015/0037221 A1* | 2/2015 | Shibata | F01N 3/0222 422/177 |
| 2015/0093540 A1* | 4/2015 | Ichikawa | C04B 35/573 428/117 |
| 2015/0275726 A1* | 10/2015 | Tamai | B01J 35/04 428/116 |
| 2017/0282108 A1 | 10/2017 | Mizuno et al. | |

* cited by examiner

PLUGGED HONEYCOMB STRUCTURE AND METHOD FOR FORMING PLUGGED HONEYCOMB STRUCTURE

"The present application is an application based on JP-2016-092445 filed on May 2, 2016 with Japan Patent Office, the entire contents of which are incorporated herein by reference."

BACKGROUND OF THE INVENTION

Field of the Invention

The present invention relates to a plugged honeycomb structure and a method for forming a plugged honeycomb structure. More specifically, the present invention relates to a plugged honeycomb structure, including a plugging portion that is used for an exhaust-gas purifying apparatus and a trapping filter to trap particulate matter included in fluid, such as exhaust-gas emitted from a diesel engine or the like, for removal, and relates to a method for forming such a plugged honeycomb structure.

Description of the Related Art

Exhaust gas (fluid) emitted from a diesel engine for an automobile, for example, contains various particulate matters, such as dust, soot and carbon particulates. These particulate matters emitted into the air affect a natural environment greatly. Therefore, various legal restrictions regulate direct emission of exhaust-gas, for example, into the air. Then, a purifying treatment is performed before the emission, using an exhaust-gas purifying apparatus and a trapping filter.

Such the exhaust-gas purifying apparatus used for the purifying treatment typically includes a plugged honeycomb structure, and this plugged honeycomb structure includes a honeycomb substrate made of ceramic having a partition wall that defines a plurality of cells extending from one end face to the other end face and serving as a through channel of fluid, and a plugging portion plugging cells of the honeycomb substrate at the end faces in accordance with a predetermined arrangement standard (see Patent Document 1, for example).

The exhaust-gas containing particulate matter, for example, flows into the plugged honeycomb structure from one end face, and passes through the partition wall made of a porous ceramic material. Through the passage, the particulate matter is trapped at the surface of the partition wall and the inside of the partition wall. As a result, a clean purified gas emitted from the other end face of the plugged honeycomb structure does not include the particulate matter, which was contained in the exhaust-gas before the passage.

Fluid, such as exhaust-gas, is speedily guided to the exhaust-gas purifying treatment apparatus that is directly connected with the exhaust system, such as a diesel engine. Therefore, the fluid immediately after the emission from the diesel engine or the like is still at high temperatures. A plugged honeycomb structure, therefore, has to have an excellent thermal property, such as heat resistance and thermal shock resistance, so as to resist thermal shock when it is exposed to fluid at high temperatures for a long time. To this end, the plugged honeycomb structure is mainly made of a ceramic material.

For instance, a ceramic material used as a raw material of a plugged honeycomb structure (mainly its partition wall) includes base material particulates (which may be called an aggregate) and a binder binding the base-material particulates while defining pores between these base-material particulates. In a specific example, silicon carbide, silicon nitride or the like is used as the base material (aggregate), and crystalline and porous cordierite is used as the binder. The binder partially includes a rare-earth element or a zirconium element as well (see Patent Document 2, for example).

[Patent Document 1] JP-A-2003-254034
[Patent Document 2] JP-A-2015-67473

SUMMARY OF THE INVENTION

When a fluid is purified by the exhaust-gas purifying apparatus including a plugged honeycomb structure as stated above, particulate matter trapped, such as soot, will be accumulated a lot at the inside of the cells of the plugged honeycomb structure. As described above, a plugged honeycomb structure is provided with a plurality of plugging portions at the cells on one end face and on the other end face, and the plugging portions are provided in accordance with arrangement standards specified in advance.

Therefore, as compared with one end face (inflow side end face) on the inflow side (inlet side) of the fluid of the plugged honeycomb structure, the flow of the fluid is particularly restricted at the plugging portion on the other end face (outflow side end face) on the outflow side (outlet side) of the fluid. As a result, a lot of particulate matter tends to accumulate especially at the inside of the cells that are located upstream of the cells provided with such a plugging portion.

Therefore, a regeneration treatment is typically performed, and in this treatment, gaseous fluid at high temperatures is forcibly introduced into the plugged honeycomb structure having particulate matter accumulated therein to remove the particulate matter accumulated at the inside of the cells. The particulate matter often includes dust, soot or carbon particulates as stated above. As a result of the treatment, the gaseous fluid at high temperatures is allowed to come in contact with the particulate matter in the air containing oxygen, whereby oxygen in the air and the particulate matter bind to generate carbon dioxide. That is, through the regeneration treatment as stated above, particulate matter in a solid state is gasified to be carbon dioxide, and the carbon dioxide is discharged from the other end face. Thereby the particulate matter can be removed relatively easily from the inside of the cells of the plugged honeycomb structure, and so the honeycomb structure can easily be restored to a state before trapping the particulate matter.

Such a regeneration treatment may be conducted regularly at a frequency or with a period specified in advance, or may be conducted as needed depending on the amount of particulate matter accumulated at the inside of the cells. This can prevent problems that may adversely affect the trapping performance of particulate matter because of cracks generated in the plugged honeycomb structure during the regeneration treatment, and so can lengthen the life of the plugged honeycomb structure.

Such a regeneration treatment, however, is to forcibly feed gaseous fluid at high temperatures so that the gaseous fluid flows through a plugged honeycomb structure, and this treatment may lead to the following problems. That is, high energy cost may be required to generate gaseous fluid at high temperatures for gasifying of the particulate matter. In this case, such gaseous fluid at high temperatures can be generated from a diesel engine, for example, by controlling the rotating speed of the diesel engine or by injecting fuel directly to a duct for the regeneration treatment. As a result, a lot of fuel is consumed as compared with the normal operation of a diesel engine.

When the frequency of the regeneration treatment as stated above increases and the treatment is performed frequently to prevent cracks, for example, of a plugged honeycomb structure, the amount of fuel consumed increases and the fuel economy performance of a diesel engine, for example, in its overall operation may deteriorate greatly. Such a treatment, which converts particulate matter, such as soot, into carbon dioxide and emits the carbon dioxide into the air, is not very favorable in terms of the influences in a natural environment because it emits carbon dioxide as one factor in global warming.

A reduction in the frequency of the regeneration treatment for a plugged honeycomb structure as low as possible has been demanded to keep a high fuel economy performance while reducing the fuel consumption and to reduce the amount of carbon dioxide emission.

However, a reduction in the frequency of the regeneration treatment inevitably leads to an increase in the amount of particulate matter accumulated at the inside of the cells of the plugged honeycomb structure. When gaseous fluid at high temperatures is fed into a plugged honeycomb structure in such a state, the amount of heat may increase locally at a part where a lot of particulate matter accumulates, e.g., at a part close to an upstream position of the plugging portion on the outflow side end face, and the temperature may become very high at the part. As a result, thermal stress applied to the plugged honeycomb structure increases and the plugged honeycomb structure cannot resist the thermal stress. This leads to a high possibility of cracks at intersections of the partition walls of the cells. This may lead to a problem, such as a breakage of the plugged honeycomb structure.

As such an excessive amount of particulate matter accumulates while involving a local increase in the amount of heat in the plugged honeycomb structure, the temperature of the plugged honeycomb structure as a whole may increase. This may lead to a problem, such as melting of a part of the partition wall in the plugged honeycomb structure, because the raw material of the partition wall of the plugged honeycomb structure reaches a temperature of its melting point or higher.

In view of the above current condition, the present invention aims to provide a plugged honeycomb structure capable of suppressing and mitigating the concentration of thermal stress to a local part and of suppressing the degree of cracks at the inside of the cells, and to provide a method for forming such a plugged honeycomb structure.

The present invention provides a plugged honeycomb structure and a method for forming a plugged honeycomb structure to fulfill the above aim.

According to a first aspect of the present invention, a plugged honeycomb structure is provided, including: a honeycomb substrate having one end face and the other end face, the honeycomb substrate having a porous partition wall that defines a plurality of cells extending from the one end face and the other end face and serving as a through channel of fluid; and a plugging portion configured to plug the cells at the one end face of the honeycomb substrate in accordance with a predetermined arrangement standard, and to plug the residual cells at the other end face; wherein the plugged honeycomb structure is configured to trap particulate matter included in the fluid flowing from an inflow side end face as the one end face of the honeycomb substrate to an outflow side end face as the other end face, the partition wall includes, as raw materials, particulates of a base material and a binder to bind the base-material particulates and having a melting point lower than a melting point of the base material, the base material has a particle diameter in a range of 5 µm to 60 µm, a mass ratio of the binder to a total mass of the raw materials including the base material and the binder is in a range of 22 mass % to 45 mass %, and the cells include round cells as a part, the round cells being defined by a circular-arc partition wall having a circular-arc shape that is at least a part of the partition wall to have a circular shape, an elliptical shape or a semi-circular shape.

According to a second aspect of the present invention, the plugged honeycomb structure according to the first aspect is provided, wherein a ratio of the number of the round cells to a total number of the cells on an orthogonal face orthogonal to a honeycomb-axis direction of the plugged honeycomb structure is 10% or more.

According to a third aspect of the present invention, the plugged honeycomb structure according to the first or second aspects is provided, wherein the round cells are located close to the plugging portion disposed at the outflow side end face.

According to a fourth aspect of the present invention, the plugged honeycomb structure according to any one of the first to third aspects is provided, wherein the round cells are formed by deforming a plurality of polygonal-shaped polygonal cells defined by the partition wall of a polygonal plugged honeycomb structure before trapping the particulate matter, the deformation being performed by feeding the fluid to the polygonal plugged honeycomb structure from an inflow side end face and exposing the binder to a temperature of the melting point or more after trapping of the particulate matter.

According to a fifth aspect of the present invention, the plugged honeycomb structure according to any one of the first to fourth aspects is provided, wherein the curvature radius at partition wall intersections of the circular-arc partition wall that defines the round cells is set at 250 µm or more.

According to a sixth aspect of the present invention, the plugged honeycomb structure according to any one of the first to fifth aspects is provided, wherein the binder has a melting point of 1100° C. or more.

According to a seventh aspect of the present invention, the plugged honeycomb structure according to any one of the first to sixth aspects is provided, wherein the base material and the binder includes one or a plurality of ceramic materials selected from the group consisting of cordierite, alumina, mullite, silicon nitride, silicon carbide, and aluminum titanate.

According to an eighth aspect of the present invention, the plugged honeycomb structure according to the seventh aspect is provided, wherein the base material includes the silicon carbide, and the binder includes the cordierite.

According to a ninth aspect of the present invention, a method for forming the plugged honeycomb structure according to any one of the first to eighth aspects is provided, including: feeding the fluid to a polygonal plugged honeycomb structure having one end face and the other end face so that the fluid flows from an inflow side end face as the one end face to an outflow side end face the other end face, the polygonal plugged honeycomb structure including a honeycomb substrate having a porous partition wall that defines a plurality of polygonal cells extending from the one end face to the other end face and serving as a through channel of the fluid; and a plugging portion configured to plug the polygonal cells at the one end face of the honeycomb substrate in accordance with a predetermined arrangement standard and to plug the residual polygonal cells at the other end face; trapping particulate matter included in the fluid so that the particulate matter accumulates at an inside of the polygonal cells having the plugging portion at the outflow side end face; and deforming at least a part of the polygonal cells into round cells to have a circular shape, an elliptical shape, or a semi-circular shape, the deformation being performed by exposing the polygonal plugged honeycomb structure having the particulate matter accumulated at the inside of the cells during the particulate matter trapping step to a temperature of a melting point of the binder or higher so as to deform the partition wall into a circular-arc partition wall having a circular-arc shape to define the shape of the round cells.

According to the plugged honeycomb structure and the method for forming a plugged honeycomb structure of the present invention, a predetermined ratio of round cells are included as a part of the cells. Thereby thermal stress applied to the inside of the plugged honeycomb structure during trapping of particulate matter can be dispersed and thermal stress locally applied to partition wall intersections or the like can be suppressed. This can keep the strength of the plugged honeycomb structure on the inside of the plugged honeycomb structure and can suppress the number of cracks.

Especially, unlike a plugged honeycomb structure including round cells as a part of the cells formed in advance, the plugged honeycomb structure of the present invention includes round cells that are formed by preparing a conventional polygonal plugged honeycomb structure including polygonal cells, followed by feeding fluid including particulate matter into the polygonal plugged honeycomb structure. Thereby a decrease in cell density and an increase in pressure loss at the beginning of the trapping can be prevented. Further, since the binder used has a melting point lower than that of the base material and the particle diameter of the base material and the mass ratio of the binder are adjusted appropriately, round cells can be easily formed during a regeneration treatment conducted after trapping of particulate matter.

DESCRIPTION OF THE PREFERRED EMBODIMENTS

Figure 1:
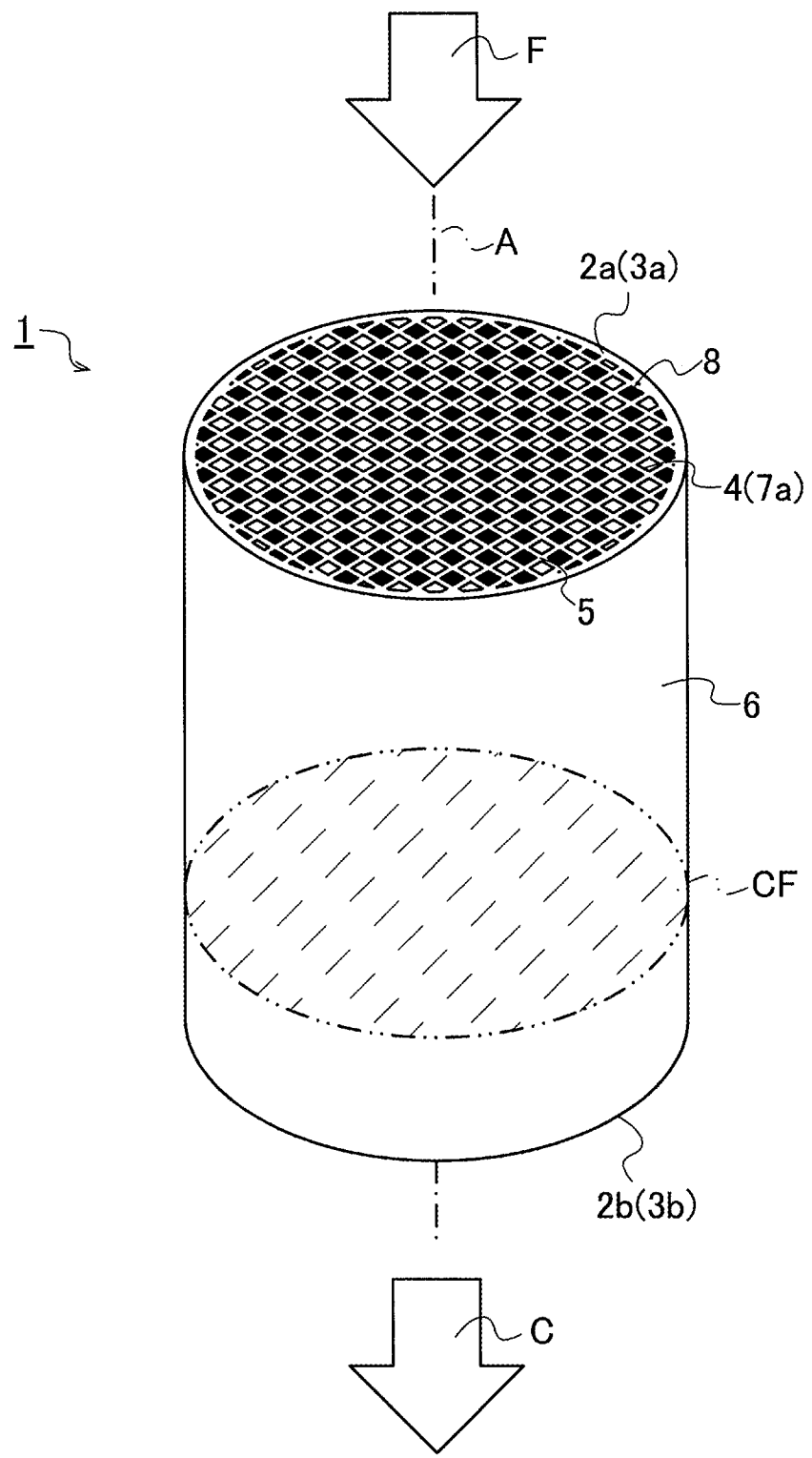
FIG. 1 is a perspective view schematically showing one embodiment of the plugged honeycomb structure of the present invention.

The following describes a plugged honeycomb structure and a method for forming a plugged honeycomb structure according to the present invention in details, with reference to the drawings. A plugged honeycomb structure and a method for forming a plugged honeycomb structure according to the present invention are not limited to the following embodiments, and various modifications, corrections and improvements may be added thereto without departing from the scope of the present invention.

1. Plugged Honeycomb Structure

As shown in FIGS. 1 to 5, a plugged honeycomb structure 1 of the present embodiment has a substantially round pillar-shaped. The plugged honeycomb structure includes: a honeycomb substrate 6 having a partition wall 5 made of porous ceramic material, the partition wall defining a plurality of cells 4 extending from one end face 2a (inflow side end face 3a of the plugged honeycomb structure 1) to the other end face 2b (outflow side end face 3b of the plugged honeycomb structure 1) and serving as a through channel of fluid F (see arrows in FIGS. 1, 3, and 4), such as exhaust-gas, containing particulate matter 10; and a plugging portion 8 plugging open ends 7a of the cells 4 of the honeycomb substrate 6 at the one end face 2a in accordance with a predetermined arrangement standard and plugging open ends 7b of the residual cells 4 at the other end face 2b.

In the plugged honeycomb structure 1 of the present embodiment, at least a part of the cells 4 are round cells 9 that are defined as a circular shape, an elliptical shape or a semi-circular shape by a circular-arc partition wall 5a having a circular-arc shape. A round cell 9 cannot be seen directly from the inflow side end face 3a and the outflow side end face 3b of the plugged honeycomb structure 1 about the shape, and can be seen by cutting the plugged honeycomb structure 1 taken along an orthogonal face CF (see a virtual cross section surrounded by the two-dot chain line in FIG. 1, or see a cross section along CF-CF line in FIG. 4) that is orthogonal to the honeycomb-axis direction A (see a dot-and-dash line in FIG. 1) of the plugged honeycomb structure 1. That is, the round cells 9 are placed inside of the plugged honeycomb structure 1 of the present embodiment. On the contrary, the cells 4 on the inflow side end face 3a (one end face 2a) and the outflow side end face 3b (the other end face 2b) have a polygonal shape (quadrangular shape in the present embodiment).

In the plugged honeycomb structure 1 of the present embodiment, the ratio of the number of the round cells 9 to the total number of the cells 4 on the orthogonal face CF (corresponding to a virtual cross section) is set at 10% or more. To obtain the effect of mitigating the concentration of thermal stress from the round cells 9, for example (the details are described later), a predetermined number or more of the round cells 9 has to be present relative to the total number of the cells 4 on the orthogonal face CF.

Note here that the position of the round cells 9 in the plugged honeycomb structure 1 is not limited to the embodiment as stated above, and the round cells may be formed at any position along the honeycomb-axis direction A. That is, the round cells 9 may be formed at open ends 7a, 7b of the cells 4 at one end face 2a or at the other end face 2b of the honeycomb substrate 6 without the plugging portion 8 so that the round cells can be directly seen from the outside of the plugged honeycomb structure 1.

However, from the viewpoint of a method for forming the round cells 9 and the advantageous effect of the round cells 9 described later, the round cells are particularly preferably formed inside of the plugged honeycomb structure 1 as in the plugged honeycomb structure 1 of the present embodiment, especially at an upstream position close to the outflow side end face 3b.

In the plugged honeycomb structure 1 of the present embodiment, a well-known plugging portion that is used in a conventional plugged honeycomb structure can be used for a plugging portion 8 to plug the cells 4. In the plugged honeycomb structure 1 of the present embodiment, every other open ends 7a of the cells 4 are plugged alternately at one end face 2a to form one line, and the positions of the plugging portions 8 at the next upper and lower lines are shifted to the left and right by one for plugging alternately, so that a plurality of the plugging portion 8 are disposed like a grid to have a checkerboard pattern (See FIG. 1, for example).

Similarly, a grid-like plugging portions 8 is disposed so that the positions of the plugging portions are shifted alternately also in the residual cells 4 at the other end face 2b of the honeycomb substrate 6. The residual cells 4 are the cells 4 without the plugging portion 8 at the one end face 2a. As a result, both of the one end face 2a (inflow side end face 3a) and the other end face 2b (outflow side end face 3b) are plugged in accordance with their predetermined arrangement standards. Such an arrangement standard of the plugging portion 8 is not limited to a checkerboard pattern as stated above, and any standard can be set.

Additionally, the shape of the individual cells does not need to be the same, and a plugged honeycomb structure may include the combination of two types of mutually adjacent cells that are different in size. The shape of the cells is not limited to a square as shown in FIG. 1 or the like, and the cells may have another polygonal shape, such as a hexagonal or octagonal shape.

A material to form the plugging portion 8 is not limited especially, and a plugging material including the combination of a well-known ceramic material, alcohol, organic binder and the like may be used. As the well-known ceramic material, at least one type selected from the group consisting of silicon carbide, silicon-silicon carbide based composite material, cordierite, mullite, alumina, spinel, silicon carbide-cordierite based composite material, lithium aluminum silicate and aluminum titanate may be used. These materials may be selected, depending on the raw material of the partition wall making up the plugged honeycomb structure, for example.

Such a plugging portion 8 disposed at the honeycomb substrate 6 of the plugged honeycomb structure 1 allows the plugged honeycomb structure 1 to be used as one element of an exhaust-gas purifying apparatus and a particulate trapping filter, for example. When fluid F is fed into the plugged honeycomb structure 1 so that the fluid flows through the inflow side end face 3a to the outflow side end face 3b, the fluid F flowing (entering) through the cells 4 opening at the open ends 7a of the inflow side end face 3a will continuously flow toward the outflow side end face 3b along the honeycomb-axis direction A.

However, the cells 4 at the open ends 7b at the outflow side end face 3b opposed to the inflow side end face 3a are plugged with the plugging portion 8. Therefore, such a behavior of the flowing fluid F is restricted. Therefore the fluid F flowing into passes through the porous partition wall 5 and is discharged from the plugged honeycomb structure 1 through the open ends 7b of the cells 4 that are open at the outflow side end face 3b (see fluid F' shown with the two-dot chain lines in FIGS. 3 and 4).

That is, the fluid F flowing in through the cells 4 that are open at the inflow side end face 3a will not be discharged from the plugged honeycomb structure 1 through the cells 4 because of the presence of the plugging portion 8 at the outflow side end face 3b. This restricts the behavior of the flowing fluid F, and a lot of particulate matter 10 included in the fluid F accumulates near the outflow side end face 3b having the plugging portion 8 (see FIG. 3). As the fluid F passes through the porous partition wall 5 as well, the particulate matter 10 is trapped at the surface of the partition wall and the inside of the partition wall. As a result, the fluid F is purified by removing the particulate matter 10 included in the fluid F, and the purified fluid C can be discharged through the outflow side end face 3b.

The partition wall 5 making up the plugged honeycomb structure 1 of the present embodiment may be made of a ceramic material that is substantially the same as that of the plugging portion 8 as stated above. More specifically, the partition wall 5 includes, as the raw materials 13, a particulate base material 11 and a binder 12 to bind the base materials 11 and having a melting point lower than that of the base material 11 (see FIG. 2).

One example of the ceramic material used for the base material 11 and the binder 12 of the partition wall 5 includes one or a plurality of types selected from the group consisting of cordierite, alumina, mullite, silicon nitride, silicon carbide, and aluminum titanate. In the descriptions of the plugged honeycomb structure 1 of the present embodiment, the base material 11 includes particulates made of silicon carbide (SiC) and the binder 12 includes cordierite, unless otherwise specified.

The binder 12 used for the partition wall 5 has a melting point lower than that of the base material 11. Thereby, when the plugged honeycomb structure 1 is exposed to high temperatures, the binder 12 firstly melts before the base material 11. This can facilitate the formation of the round cells 9 that are defined by the circular-arc partition wall 5a from polygonal cells 14 (the details are described later).

Considering a melting point of a typical ceramic material, the binder 12 preferably has a melting point that is at least 1100° C. or more. This means that the particulate base material 11 also has a melting point of 1100° C. or more naturally, and the base material 11 hardly melts. As a result, a part of the binder 12 in the raw material 13 melts due to the fluid F including the particulate matter 10, so that the round cells 9 can be easily formed in the plugged honeycomb structure 1 of the present embodiment (the details are described later).

The base material 11 of the partition wall 5 has a particle diameter in the range of 5 μm to 60 μm. If the particle diameter of the base material 11 is less than the strength of the base material 11 itself often is low. As a result, the plugged honeycomb structure 1 itself including such a base material 11 has low heat resistance and thermal shock resistance, and cracks or the like likely occur during the use. Thus, the particle diameter of the base material 11 has to be at least 5 μm or more.

On the contrary, if the particle diameter of the base material 11 is larger than 60 μm, even when the binder 12 has a melting point lower than that of the base material 11 and the plugged honeycomb structure 1 is exposed to a temperature higher than the melting point of the binder 12, the particulate base material 11 mutually interferes and the partition wall 5 has difficulty to be deformed into the circular-arc partition wall 5a. As a result, the round cells 9 may not be formed easily (the details are described later). Therefore, the particle diameter of the base material 11 is limited to the above range.

Additionally the mass ratio of the binder 12 to the total mass of the raw materials of the base material 11 and the binder 12 making up the partition wall 5 is limited to the range of 22 mass % to 45 mass %. If the mass ratio of the binder 12 is less than 22 mass %, even when the plugged honeycomb structure 1 having the partition wall 5 including the binder 12 is exposed to a high temperature and reaches the melting point of the binder 12 or more (e.g., 1100° C. or more), the partition wall 5 has difficulty to be deformed into the circular-arc partition wall 5a because the ratio of the binder 12 is small. As a result, the round cells 9 may not be formed easily (the details are described later). Therefore, the mass ratio of the binder 12 is limited to the above range.

In the plugged honeycomb structure 1 of the present embodiment, the curvature radius R at partition wall intersections 15 of the circular-arc partition wall 5a defining the round cells 9 is set at 250 μm or more. If the curvature radius R of the partition wall intersections 15 is less than 250 μm, thermal stress will be concentrated on the partition wall intersections 15 where a plurality of partition walls 5, 5a intersect, and the effect of dispersion by the circular-arc partition wall 5a is weakened. Therefore, thermal stress will be concentrated similarly to the grid-like partition wall, and cracks will easily occur. Thus, the curvature radius R at partition wall intersections 15 of the circular-arc partition wall 5a is set at 250 μm or more.

2. Method for Forming Plugged Honeycomb Structure (Deformation of Round Cells)

The plugged honeycomb structure 1 of the present embodiment is formed by the following method. The method for forming the plugged honeycomb structure 1 of the present invention is not limited to this, and the plugged honeycomb structure may internally have round cells 9 formed in advance.

Figure 3:
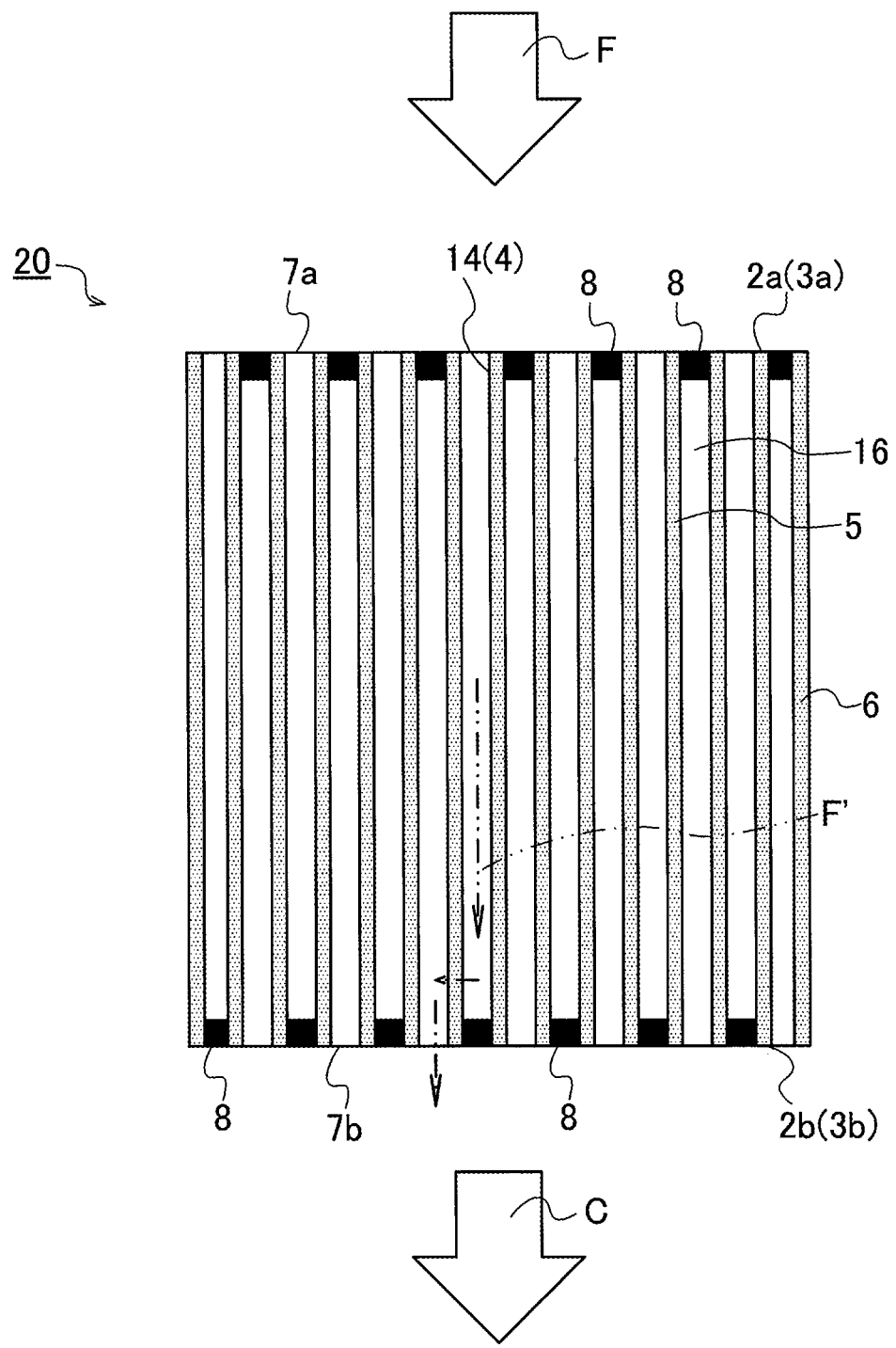
FIG. 3 is a cross-sectional view schematically showing a polygonal plugged honeycomb structure before trapping particulate matter.
Figure 4:
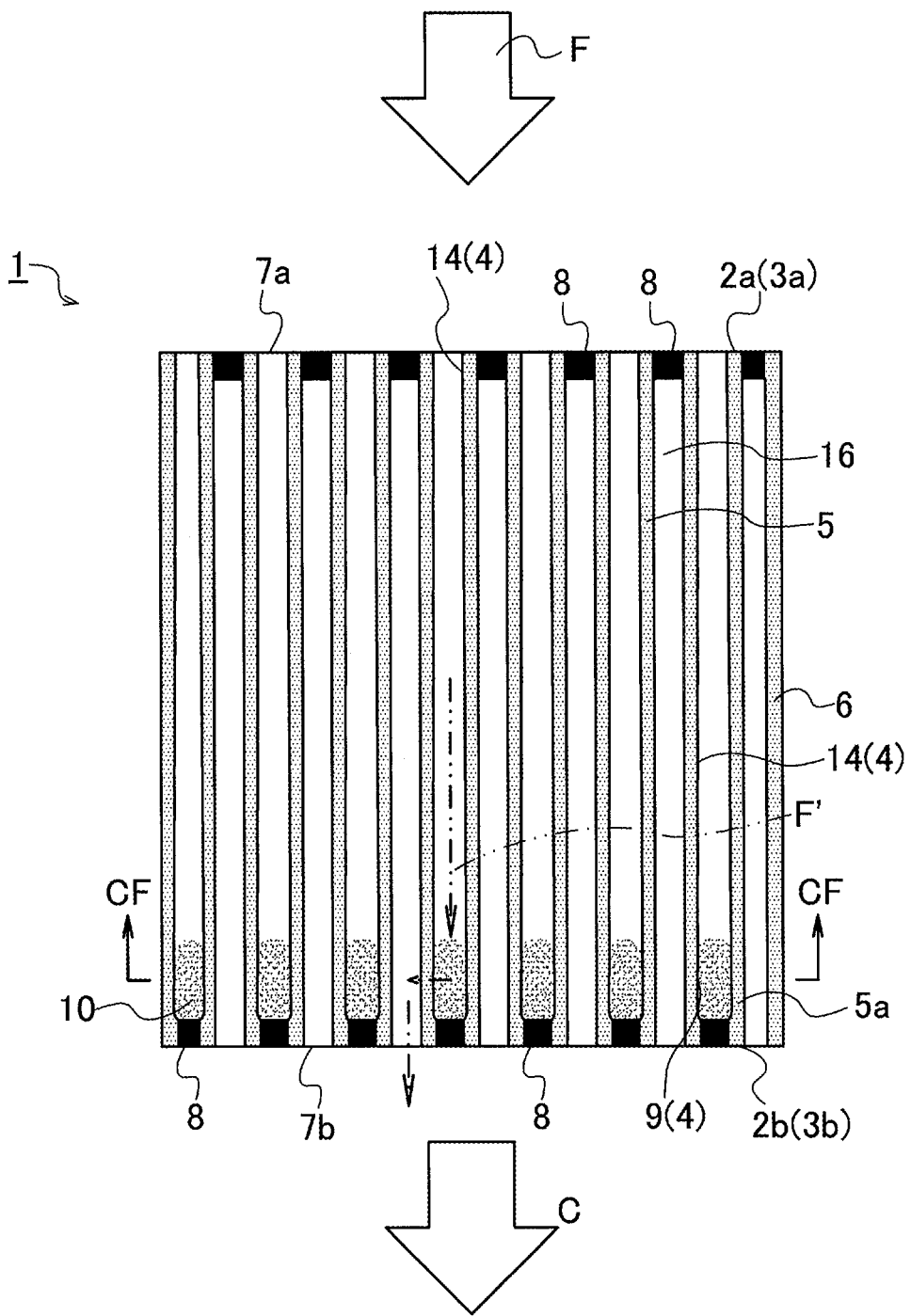
FIG. 4 is a cross-sectional view schematically showing a plugged honeycomb structure of the present embodiment including round cells formed after trapping particulate matter.

The plugged honeycomb structure 1 of the present embodiment is formed starting with a polygonal plugged honeycomb structure 20 as a raw material. As shown in FIG. 3, a polygonal plugged honeycomb structure 20 includes a honeycomb substrate 6 having a partition wall 5 defining a plurality of polygonal cells 14 and a plugging portion 8 plugging one end face 2a and the other end face 2b of the honeycomb substrate 6 in accordance with their predetermined arrangement standards. That is, the polygonal plugged honeycomb structure 20 is of a well-known type that is conventionally used for an exhaust-gas purifying apparatus or the like, and is different from the plugged honeycomb structure 1 of the present embodiment in that it does not have round cells 9 therein.

The polygonal plugged honeycomb structure 20 is the same as the plugged honeycomb structure 1 of the present embodiment described above in the configuration of the partition wall 5 (base material 11 and binder 12), the binder 12 having a melting point lower than that of the base material 11, the particle diameter of the base material 11, the mass ratio of the binder 12 to the total mass of the raw materials 13, the melting point of the binder, the ceramic materials used for the base material 11 and the binder 12 and the like.

In the following descriptions on the polygonal plugged honeycomb structure 20, like numerals indicate like components of the plugged honeycomb structure 1 of the present embodiment to omit their descriptions. Since a method for manufacturing the polygonal plugged honeycomb structure 20 (conventional plugged honeycomb structure) is well known, the descriptions are omitted.

Figure 2:
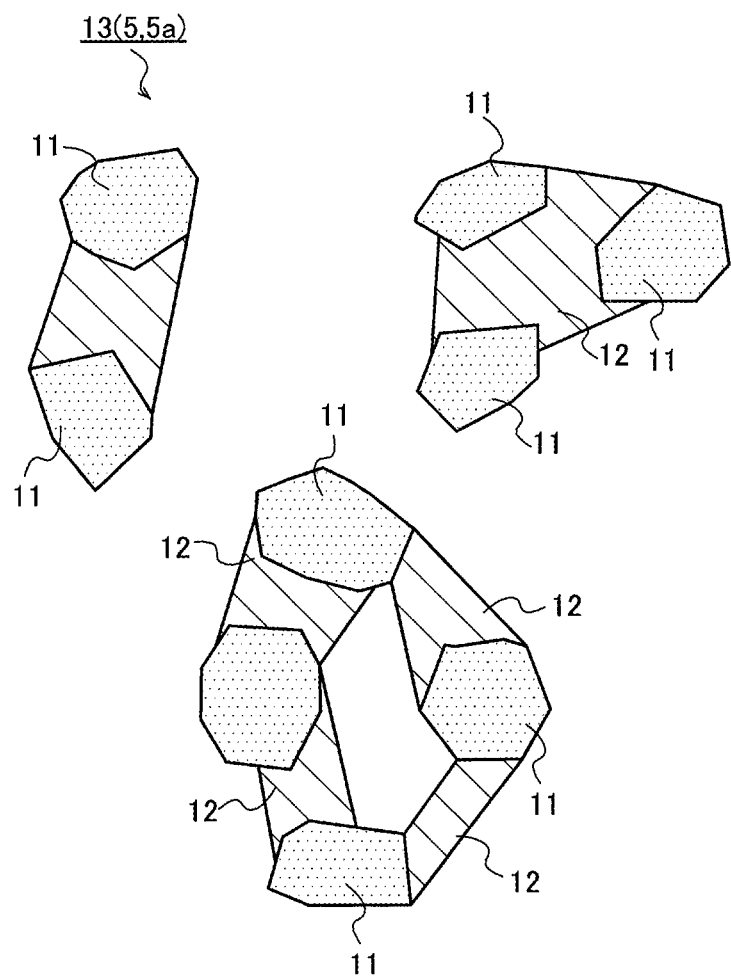
FIG. 2 schematically describes a base material and binder to bind the base material in the partition wall.

Such a polygonal plugged honeycomb structure 20 is assembled into an exhaust-gas purifying apparatus or the like, and fluid F is fed so that the fluid flows from one end face 2a (inflow side end face 3a) of the honeycomb substrate 6 to the other end face 2b (outflow side end face 3b) (fluid inflow step: see FIGS. 2 and 3). Through this step, particulate matter 10 included in the fluid F is trapped at the inside 16 of the cells of the polygonal plugged honeycomb structure 20 (particulate matter trapping step). Since the particulate matter 10 is trapped similarly to the particulate matter trapped with the plugged honeycomb structure 1 described above, the descriptions are omitted.

Through the particulate matter trapping step, the particulate matter 10 accumulates at the inside 16 of the cells. The fluid F may be exhaust-gas emitted from a diesel engine or the like, and is at high temperatures. The binder 12 has a melting point lower than that of the base material 11 making up the partition wall 5, the particle diameter of the base material 11 is in the range of 5 μm to 60 μm, and the mass ratio of the binder 12 to the total mass of the raw materials 13 is in the range of 22 mass % to 45 mass %.

The polygonal plugged honeycomb structure 20 satisfying these conditions are exposed to a temperature higher than the melting point of the binder 12 because of the fluid F at high temperatures during a regeneration treatment, whereby a part of the binder 12 making up at least a part of the partition wall 5 that defines the polygonal cells 14 melts. As a result, a part of the grid-like partition wall 5 is deformed to a circular-arc partition wall 5a having a partially curved part. Thereby the polygonal cells 14 are deformed into round cells 9 that are at least partially defined by the circular-arc partition wall 5a (round cell deforming step).

That is, the binder 12 having a melting point lower than that of the base material 11 is used and fluid F at high temperatures including particulate matter 10 is fed under predetermined conditions. Thereby a part of the polygonal cells 14 can be deformed into round cells 9. As a result, thermal stress, which would be concentrated especially on the partition wall intersections 15, can be dispersed, and problems such as cracks can be suppressed.

As compared with a plugged honeycomb structure having round cells formed in advance, this method can avoid the lowering of cell density and deterioration in pressure loss after accumulation of particulate matter 10. In this respect, this method is particularly preferable. Note here that, in some usage, a plugged honeycomb structure having round cells formed in advance also can have sufficient advantageous effects.

The following describes a plugged honeycomb structure and a method for forming a plugged honeycomb structure according to the present invention by way of examples, and the plugged honeycomb structure or the like of the present invention is not limited to them.

EXAMPLES

1. Plugged Honeycomb Structure (Polygonal-Cell Plugged Honeycomb Structure)

Plugged honeycomb structures of Examples 1 to 5 and Comparative Examples 1 to 5 were formed using well-known polygonal-cell plugged honeycomb structures formed in advance by the method for forming a plugged honeycomb structure as stated above. Before forming round cells, the cells of all of the polygonal cell plugged honeycomb structures had a quadrangular shape, and their honeycomb diameter and honeycomb length were 143.8 mm and 152.4 mm, respectively. The following Table 1 shows the cell shape of the polygonal cell plugged honeycomb structures before forming the plugged honeycomb structures of Examples 1 to 5 and Comparative Examples 1 to 5, the particle diameter of the base material making up the partition wall, and the mass ratio of the binder included in the partition wall to the total mass of the raw materials. For the plugged honeycomb structures (polygonal plugged honeycomb structures) of Examples 1 to 5 and Comparative Examples 1 to 5, particulates of silicon carbide (SiC) were used as the base material, and cordierite was used as the binder. Silicon carbide (SiC) used as the base material had a melting point of 2730° C., and cordierite used as the binder had a melting point of 1400° C. In Comparative Example 1, cordierite was used as the base material, and no binder was used. The melting points of the base material and the binder were measured as follows. Through X-ray diffraction measurement using an X-ray analyzer (the details are described later), crystalline phases of their configurations can be identified. After identifying their crystalline phases, the melting points can be measured using a well-known melting-point apparatus. Alternatively, the melting points may be identified referring to well-known values written on documents based on the identified crystalline phases.

2. Measurement of Particle Diameter of Base Material

The particle diameter of the base material making up the partition wall was measured through electron microscope observation as stated below. Specifically, a 5 mm-square cubic piece for electron microscope observation was cut out from the plugged honeycomb structures of Examples 1 to 5 and Comparative Examples 1 to 5. The cutting was performed so that a cross section of the partition wall appeared on the surface of the cubic piece. Next, the obtained test piece was embedded in resin and the resin was cured, and then the surface thereof was ground. After that, an SEM photo-image (scanning electron micrograph) of a part of the surface of the test piece after grinding where a cross section of the partition wall appeared was taken at 400-fold magnification. Image processing was performed to an SEM image of the taken SEM photo-image so as to identify the base material and the binder in the SEM image. Specifically, a part including the base material and a part including the binder were distinguished by their colors in the SEM image subjected to the image analysis. For the scanning electron microscope to take an SEM photo-image, SU9000 (manufactured by Hitachi High-Technologies Corporation) was used. A SEM image taken was analyzed using an image processing system XG (manufactured by Keyence Corporation).

After identifying the base material and the binder by the image analysis, the particle diameter of the base material was calculated. The particle diameter of the base material means a particle diameter (sphere-equivalent diameter) that is obtained by considering the base material as sphere particulates. Firstly the area (cross-sectional area) of a particulate of the base material on the taken SEM image was measured by image processing. Next, the particulate subjected to the measurement of the area of was converted into a granular particulate having the same area, and the diameter of the latter was calculated as the particle diameter of the base material.

3. Calculation of Mass Ratio

Mass ratio of the binder included in the partition wall to the total mass of the raw materials was calculated by the following method. Firstly, an X-ray diffraction pattern of the material of the partition wall was obtained using an X-ray diffractometer (product name: RINT, manufactured by Rigaku Corporation). At this time, X-ray diffraction was measured using CuKα-ray source and at 50 kV, 300 mA and 2θ=10 to 60°. Then, the simplified quantitative analysis was performed, whereby the mass ratio of the crystalline phase of each configuration was calculated. In the simplified quantitative analysis, the obtained X-ray diffraction data was analyzed by a RIR (Reference Intensity Ratio) method to determine the amounts of the respective components. The X-ray diffraction data was analyzed using X-ray data analysis software (product name: JADE7, manufactured by MDI Co.).

TABLE 1

| units | Cell shape | Particle diameter of base material/ μm | Mass ratio of binder/ mass % | Highest temperature during regeneration/ ° C. | Curvature radius of partition wall intersections before trapping/ μm | Curvature radius of partition wall intersections after regeneration/ μm | Ratio of the number of round cells/ % | Number of partition wall having cracks/ positions | Determination on cracks |
|---|---|---|---|---|---|---|---|---|---|
| Ex. 1 | quadrangle | 5.0 | 22.0 | 1456 | 61 | 303 | 9% | 15 | B |
| Ex. 2 | quadrangle | 60.0 | 22.0 | 1455 | 60 | 251 | 3% | 19 | B |
| Ex. 3 | quadrangle | 5.0 | 45.0 | 1450 | 60 | 401 | 56% | 3 | A |
| Ex. 4 | quadrangle | 60.0 | 45.0 | 1465 | 59 | 320 | 11% | 11 | A |
| Ex. 5 | quadrangle | 30.0 | 30.0 | 1451 | 60 | 278 | 23% | 9 | A |
| Comp. Ex. 1 | quadrangle | 30.0 | 0.0 | 1455 | 60 | round cells were not formed | 0% | 24 | Reference for determination |
| Comp. Ex. 2 | quadrangle | 4.0 | 45.0 | 1467 | 60 | 418 | 62% | 35 | D |
| Comp. Ex. 3 | quadrangle | 62.0 | 45.0 | 1462 | 60 | round cells were not formed | 0% | 23 | C |
| Comp. Ex. 4 | quadrangle | 5.0 | 21.0 | 1466 | 59 | round cells were not formed | 0% | 26 | C |
| Comp. Ex. 5 | quadrangle | 5.0 | 46.5 | 1466 | 60 | 409 | 65% | 31 | D |

4. Formation of Round Cells (Accumulation of Soot)

An exhaust-gas purifying apparatus including a polygonal plugged honeycomb structure of Example 1 to 5 and Comparative Example 1 to 5 having the particle diameter of the base material and the mass ratio of the binder shown in Table 1 was attached to an exhaust system of an automobile coming with an engine of 2.0 L in displacement. Then, exhaust-gas (fluid) was fed so that it flowed from the inflow side end face to the outflow side end face (fluid inflow step) so as to let soot (particulate matter) accumulate at the inside of the cells of the polygonal plugged honeycomb structure (particulate matter trapping step). At this time, the amount of soot accumulated was set at 12 g/L that was weight per unit volume of the polygonal plugged honeycomb structure. Through this process, soot accumulated at the inside of the cells, and the partition wall reached a temperature of the melting point of the binder or more. Thereby a part of the partition wall was deformed into a circular-arc partition wall having a circular-arc shape and at least a part of the polygonal cells was deformed into round cells of a circular shape or the like (round-cell deforming step). Thereby, plugged honeycomb structures having round cells of Examples 1 to 5 and the like were formed.

5. Regeneration Treatment

A regeneration treatment was performed to Examples 1 to 5 and Comparative Examples 1 to 5, in which soot of 12 g per unit volume of the plugged honeycomb structure accumulated, to remove the soot accumulated. Specifically, similarly to the accumulation of soot (formation of round cells), the exhaust-gas purifying apparatus was attached to the exhaust system of an automobile coming with an engine of 2.0 L in displacement. Then, the engine was rotated under the condition of 2000 rpm/80 Nm. Further, the temperature of exhaust-gas at a position before the inflow side end face of the plugged honeycomb structure by 20 mm was measured with a sheathed thermocouple (K-type, $\Phi 0.5$), and the temperature was raised to 650° C. by adjusting the amount of fuel injection. Thereafter, the engine was switched into the idle state (800 rpm/12 Nm) so as to regenerate the soot accumulated at the inside of the cells. At this time, the temperature at an upstream position of the outflow side end face of the plugged honeycomb structure by 10 mm also was measured with a sheathed thermocouple (similar to the above). Among the temperatures measured with the sheathed thermocouple, the value of the highest temperature was set as the highest temperature during the regeneration treatment (see Table 1).

6. Change in Curvature Radius Before Trapping and after Regeneration Treatment

Each of the polygonal plugged honeycomb structures before trapping soot and the plugged honeycomb structures after a regeneration treatment of Examples 1 to 5 and Comparative Examples 1 to 5 was cut along a cross section (see the orthogonal face CF in FIG. 1, for example) orthogonal to the honeycomb-axis direction so as to remove the plugging portion from the outflow side end face. Curvature radius R was measured for four measurement positions P1, P2, P3 and P4 (see FIG. 5) at the partition wall intersections of any cell on the cross section, and the average curvature radius R was calculated at the partition wall intersections of the one cell. Calculation processing similar to the above was performed to any five cells, and the average of the curvature radius R of these five cells was set as the curvature radius R of the partition wall intersections (see Table 1). The curvature radius R was measured by observing the cross section with an optical microscope or by using an enlarged image of the cross section whose image was taken at 20-fold magnification through the observation with an electronic microscope. Image analysis may be performed to such an image as needed.

Figure 5:
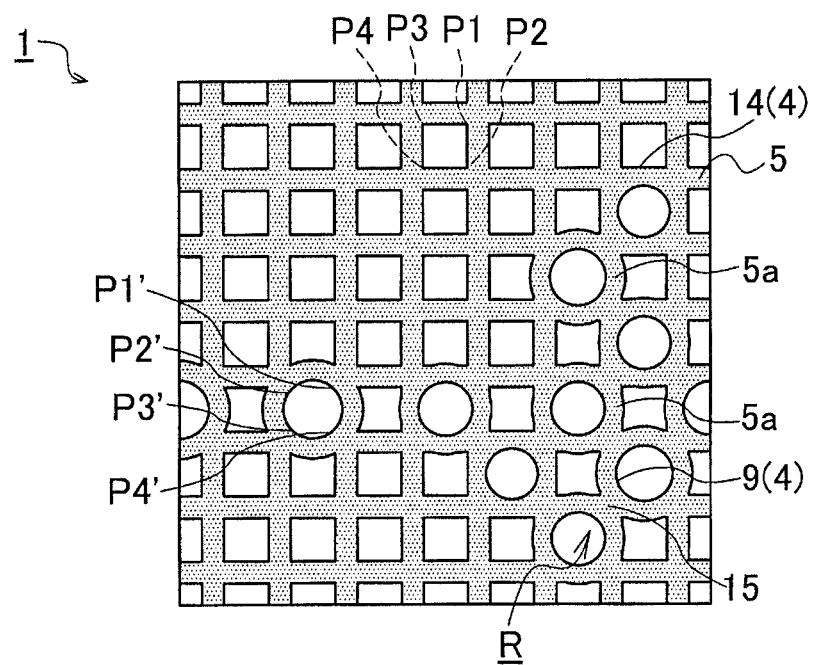
FIG. 5 is an enlarged cross-sectional view schematically showing a cross section taken along the line CF-CF of FIG. 4 on the inside of the cells close to the other end face of the plugged honeycomb structure.

In the case of round cells, curvature radius R was measured at any four measurement positions P1', P2', P3' and P4' corresponding to the deformed part (see FIG. 5), and similarly curvature radius R was measured about the deformation at the partition wall intersections of the one cell. After that, measurement was performed for up to any five cells, and their average was calculated (see Table 1). For simplifying the drawing, FIG. 5 illustrates measurement position P1 or the like at the partition wall intersections of a cell before trapping soot and measurement position P1' or the like at the partition wall intersections of a round cell after regeneration treatment. In this respect, measurement positions P1, P1' or the like are set for each of the cross sections before trapping soot and after regeneration treatment.

7. Ratio of the Number of Round Cells

The total number of cells in any range at a cross section (see the above 6) of the plugged honeycomb structure subjected to regeneration treatment was measured visually, and the number of round cells accounting for the total number of cells (the number of round cells) was measured visually. Then, the ratio of them was calculated (see Table 1). The total number of cells and the number of round cells were measured using an image at a cross section of the above 6.

8. Measurement of the Number of Partition Wall Having Cracks Generated and Determination Whether Cracks Occurred or not The number of partition walls having cracks generated was measured visually at the cross section (see the above 6, 7) of the plugged honeycomb structure subjected to regeneration treatment (see Table 1). The number of partition walls having cracks generated was measured using an image at a cross section of the above 6. Determination on the cracks was made by a comparison with the plugged honeycomb structure of Comparative Example 1 as a reference that did not include binder, Comparative Example 1 having cracks generated at 24 positions. When a decrease in the number of cracks of a half or more of the number of the cracks of Comparative Example 1 was found, the plugged honeycomb structure was evaluated as "A". When a decrease of 3 positions or more was found, the plugged honeycomb structure was evaluated as "B". When the number of cracks generated was similar to that of Comparative Example 1 (±2), the plugged honeycomb structure was evaluated as "C". When an increase in the number of cracks by 3 positions or more from Comparative Example 1 was found, the plugged honeycomb structure was evaluated as "D".

9. Summary of Examples 9.1. Particle Diameter of Base Material

As shown in Table 1, in the plugged honeycomb structures of Examples 1 to 5 including the base material that had a particle diameter in the range of 5 µm to 60 µm, round cells were found inside of all of the plugged honeycomb structures. On the contrary, in the plugged honeycomb structure of Comparative Example 2 including the base material that had a particle diameter less than 5 µm (particle diameter of base material=4 µm), although round cells were found, the number of partition walls having cracks generated was large up to 35. That is, the strength of the plugged honeycomb structure deteriorated.

In the plugged honeycomb structure of Comparative Example 3 including the base material that had a particle diameter of 60 µm or more (particle diameter of base material=62 µm), no round cells were found. Since particulates of the base material interfered with each other, deformation into round cells was suppressed. Such tendency was found in Example 2 and Example 4 as well. When the base material had a particle diameter of 60 μm, the ratio of the number of round cells accounting for the total number of cells was lower than that of other Examples 1, 3, and 5 (Example 2=3%, Example 4=11%). Therefore it was shown that the particle diameter of the base material was preferably in the range of 5 μm to 60 μm as in the present invention.

9.2 Mass Ratio of Binder

In the plugged honeycomb structures of Examples 1 to 5 having the mass ratio of the binder in the range of 22 mass % to 45 mass %, round cells were found inside of all of the plugged honeycomb structures. On the contrary, in the plugged honeycomb structure of Comparative Example 4 having the mass ratio of the binder less than 22 mass % (=21 mass %), no round cells were found. Similarly, in Comparative Example 1 not including binder as well (=0 mass %), no round cells were found. That is, in order to form a plugged honeycomb structure having round cells of the present invention, binder was indispensable in addition to the base material as the raw materials.

On the contrary, in the plugged honeycomb structure of Comparative Example 5 having the mass ratio of the binder of 45 mass % or more (mass ratio=46.5%), although round cells were found, the number of partition walls having cracks generated was large up to 31. That is, the strength of the plugged honeycomb structure deteriorated. Therefore, it was shown that the mass ratio of the binder was preferably in the range of 22 mass % to 45 mass % as in the present invention.

9.3 Change in Curvature Radius

While the curvature radius at the partition wall intersections before trapping was in the range of 59 to 61 μm in Examples 1 to 5 and Comparative Examples 1 to 5, all of the plugged honeycomb structures after regeneration treatment having round cells formed therein had the curvature radius of 250 μm or more.

9.4 Ratio of the Number of Round Cells

As shown in Table 1, in the plugged honeycomb structures of Examples 3 to 5 having the ratio of the number of round cells exceeding 10%, the number of partition walls having cracks generated was decreased to a half or more of the reference number for determination of Comparative Example 1. That is, when the ratio of the number of round cells accounting for the total number of cells was 10% or more, the effect of mitigating the concentration of thermal stress at the partition wall intersections was especially large.

As described above, the plugged honeycomb structure of the present invention can mitigate the concentration of thermal stress and can suppress cracks at the partition wall because it internally has round cells. Especially due to the particle diameter of the base material and the ratio of the binder making up the partition wall, and the binder used having a melting point lower than that of the base material, round cells can be relatively easily formed during the purifying processing to trap particulate matter in the fluid. As a result, the strength of the plugged honeycomb structure can be improved as compared with polygonal cells defined by a conventional grid-like partition wall.

Especially since round cells are not configured as a part of the cells in advance, problems occurring at the beginning of the trapping, such as a decrease in cell density and an increase in pressure loss, can be prevented.

A plugged honeycomb structure of the present invention can be particularly effectively used for an exhaust-gas purifying apparatus configured to purify particulate matter, such as particulates, included in fluid, such as exhaust-gas, emitted from a diesel engine or the like. A method for forming a plugged honeycomb structure can form the plugged honeycomb structure used in such an exhaust-gas purifying apparatus favorably.

DESCRIPTION OF REFERENCE NUMERALS

1: plugged honeycomb structure, 2a: one end face, 2b: other end face, 3a: inflow side end face, 3b: outflow side end face, 4: cell, 5: partition wall, 5a: circular-arc partition wall, 6: honeycomb substrate, 7a, 7b: open end, 8: plugging portion, 9: round cell, 10: particulate matter, 11: base material, 12: binder, 13: raw material, 14: polygonal cell, 15: partition wall intersections, 16: inside of cell, 20: polygonal plugged honeycomb structure, A: honeycomb-axis direction, C: purified fluid, CF: orthogonal face, F, F': fluid, P1, P1', P2, P2', P3, P3', P4, P4': measurement points, R: curvature radius

What is claimed is:

1. A plugged honeycomb structure, comprising: a honeycomb substrate having one end face and the other end face, the honeycomb substrate having a porous partition wall that defines a plurality of cells extending from the one end face and the other end face and serving as a through channel of fluid; and
a plugging portion configured to plug the cells at the one end face of the honeycomb substrate in accordance with a predetermined arrangement standard, and to plug the residual cells at the other end face;
wherein
the plugged honeycomb structure is configured to trap particulate matter included in the fluid flowing from an inflow side end face as the one end face of the honeycomb substrate to an outflow side end face as the other end face,
the partition wall includes, as raw materials, particulates of a base material and a binder to bind the base-material particulates and having a melting point lower than a melting point of the base material,
the base material has a particle diameter in a range of 5 μm to 60 μm,
a mass ratio of the binder to a total mass of the raw materials including the base material and the binder is in a range of 22 mass % to 45 mass %, and
the cells include round cells as a part, the round cells being defined by a circular-arc partition wall having a circular-arc shape that is at least a part of the partition wall to have a circular shape, an elliptical shape or a semi-circular shape.

2. The plugged honeycomb structure according to claim 1, wherein a ratio of the number of the round cells to a total number of the cells on an orthogonal face orthogonal to a honeycomb-axis direction of the plugged honeycomb structure is 10% or more.

3. The plugged honeycomb structure according to claim 1, wherein the round cells are located proximate to the plugging portion disposed at the outflow side end face.

4. The plugged honeycomb structure according to claim 1, wherein the round cells are formed by deforming a plurality of polygonal-shaped polygonal cells defined by the partition wall of a polygonal plugged honeycomb structure before trapping the particulate matter, the deformation being performed by feeding the fluid to the polygonal plugged honeycomb structure from an inflow side end face and exposing the binder to a temperature of the melting point or more after trapping of the particulate matter.

5. The plugged honeycomb structure according to claim 1, wherein curvature radius at partition wall intersections of the circular-arc partition wall that defines the round cells is set at 250 µm or more.

6. The plugged honeycomb structure according to claim 1, wherein the binder has a melting point of 1100° C. or more.

7. The plugged honeycomb structure according to claim 1, wherein the base material and the binder includes one or a plurality of ceramic materials selected from the group consisting of cordierite, alumina, mullite, silicon nitride, silicon carbide, and aluminum titanate.

8. The plugged honeycomb structure according to claim 7, wherein the base material includes the silicon carbide, and the binder includes the cordierite.

9. A method for forming the plugged honeycomb structure according to claim 1, comprising:

feeding the fluid to a polygonal plugged honeycomb structure having one end face and the other end face so that the fluid flows from an inflow side end face as the one end face to an outflow side end face the other end face, the polygonal plugged honeycomb structure including a honeycomb substrate having a porous partition wall that defines a plurality of polygonal cells extending from the one end face to the other end face and serving as a through channel of the fluid; and a plugging portion configured to plug the polygonal cells at the one end face of the honeycomb substrate in accordance with a predetermined arrangement standard and to plug the residual polygonal cells at the other end face;

trapping particulate matter included in the fluid so that the particulate matter accumulates at an inside of the polygonal cells having the plugging portion at the outflow side end face; and deforming at least a part of the polygonal cells into round cells to have a circular-shape, an elliptical shape, or a semi-circular shape, the deformation being performed by exposing the polygonal plugged honeycomb structure having the particulate matter accumulated at the inside of the cells during the particulate-matter trapping step to a temperature of a melting point of the binder or higher so as to deform the partition wall into a circular-arc partition wall having a circular-arc shape to define the shape of the round cells.

* * * * *